United States Patent
Dai et al.

(10) Patent No.: US 7,209,179 B2
(45) Date of Patent: Apr. 24, 2007

(54) VIDEO SIGNAL PROCESSING APPARATUS AND COMPUTER SYSTEM INTEGRATED WITH THE SAME

(75) Inventors: Ming-Hou Dai, Chungho (TW);
Wen-Chien Chang, Chungho (TW);
Jui-Hsiang Yang, Chungho (TW)

(73) Assignee: Avermedia Technologies, Inc., Chung Ho, Taipei Hsien (TW)

( * ) Notice: Subject to any disclaimer, the term of this patent is extended or adjusted under 35 U.S.C. 154(b) by 576 days.

(21) Appl. No.: 10/683,831

(22) Filed: Oct. 9, 2003

(65) Prior Publication Data

US 2005/0046745 A1 Mar. 3, 2005

(30) Foreign Application Priority Data

Sep. 2, 2003 (TW) .............................. 92124260 A (51) Int. Cl.
*H04N 7/00* (2006.01)
*H04N 5/45* (2006.01)

(52) U.S. Cl. ..................... 348/552; 348/565; 715/718
(58) Field of Classification Search ............... 348/552, 348/565, 726, 730, 714; 386/83; 725/131–134, 725/139–142, 151–153; 715/717, 718; 710/260, 710/267, 261, 264
See application file for complete search history.

(56) References Cited

U.S. PATENT DOCUMENTS 5,111,296 A 5/1992 Duffield et al.
6,233,390 B1* 5/2001 Yoneda ........................ 386/46
6,859,235 B2* 2/2005 Walters ....................... 348/448
2002/0145621 A1* 10/2002 Nguyen ...................... 345/718
2003/0043181 A1* 3/2003 Hagiwara et al. ........... 345/718
2003/0214211 A1 11/2003 Kim et al.
2005/0160364 A1* 7/2005 Taniguchi et al. .......... 715/718

* cited by examiner

Primary Examiner—Victor R. Kostak
(74) Attorney, Agent, or Firm—Pro-Techtor Int'l Services (57) ABSTRACT

A video signal processing apparatus and a computer system integrated with the video signal processing apparatus are disclosed. The video signal processing apparatus has a tuner, a video processor, a non-interlaced signal processing unit, a microprocessor, and a computer signal converter. In the video signal processing apparatus, the display can be instantly turned on and the video signal can be recorded in the storage media of a computer, and the video signal recorded in the storage media can be displayed on the display. While watching the video signal on the display, a user can execute applications in the computer simultaneously. The video signal processing apparatus further provides picture-in-picture feature by adding another set of tuner and video processor. The video signal processing apparatus can be integrated with a display or a computer, and can also be used as an external-enclosure video signal processing apparatus.

24 Claims, 5 Drawing Sheets

VIDEO SIGNAL PROCESSING APPARATUS AND COMPUTER SYSTEM INTEGRATED WITH THE SAME

BACKGROUND

1. Field of Invention

The present invention relates to a video signal processing apparatus. More particularly, the present invention relates to a video signal processing apparatus in which a display can be instantly turned on and a video signal watched on the display and recorded in a computer, as well as to a computer system integrated with the video signal processing apparatus.

2. Description of Related Art

Recently, owing to the rapid prevalence of liquid crystal displays and liquid crystal televisions, the technology for converting a television signal into a liquid crystal signal is also developing quickly. Use of liquid crystal televisions is an important trend for the future. Further, the increasing calculation speed of a computer and the larger storage capacity of storage media are helpful to store a large amount of video data. Watching a television signal on a stand-alone liquid crystal display or recording a television signal on a hard disk of a computer is in desperate need.

Conventionally, adding a television tuner card to a computer can achieve the objective of watching a television signal on the computer display, but a user has to start an operation system or a Basic Input/Output System (BIOS) of the computer when using the method mentioned above. Thus, the method cannot achieve the objective of instantly turning on the display and watching the television signal. It is relatively time-consuming and the CPU resources of the computer may be largely occupied. It is also a waste of power and harmful to the environmental.

Conventionally, there are two methods to achieve the objective of instantly turning on the display and watching the television signal. One is using a liquid crystal television (LCD TV) and the other is using an external-enclosure TV Box. Both methods can achieve the objective of instantly turning on the display and watching the television signal. However, the disadvantage of both methods is that the apparatus cannot be connected to a computer, so that the television signal cannot be recorded.

Figure 1:
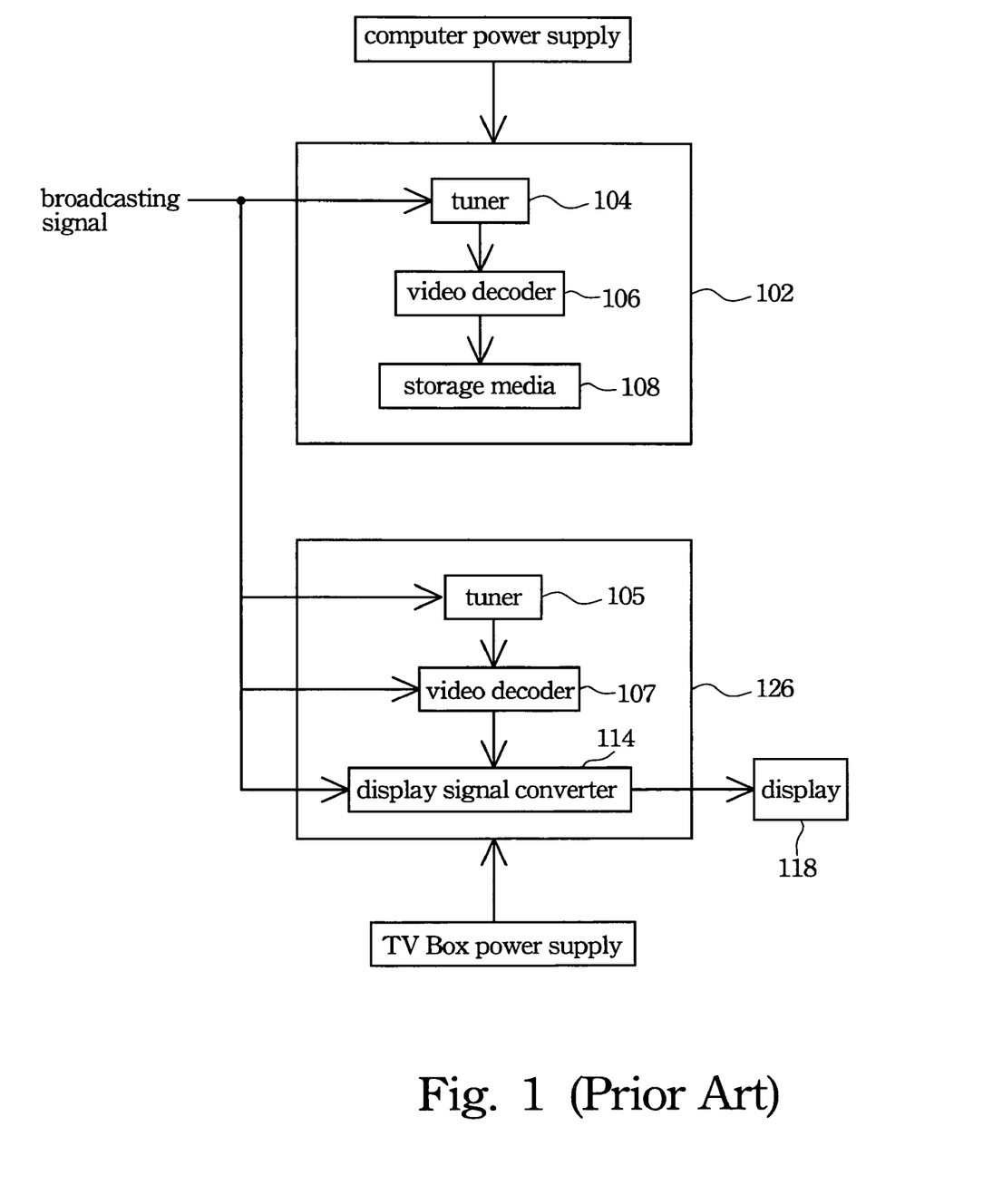
FIG. 1 is a diagram illustrating the conventional television signal processing.

There are two objectives to be considered. One objective is to be able to turn on the display instantly and to watch the television signal. The other objective is to record the television signal while watching it. A conventional method for achieving both is provided in FIG. 1. FIG. 1 is a block diagram illustrating conventional television signal processing. A broadcasting signal, such as a television signal, is received by the tuner 104 in the computer 102. The broadcasting signal is processed by the video decoder 106 in the computer and then recorded in a storage media 108, such as a hard disk. Thus, the objective of recording the video signal can be achieved.

In FIG. 1, the broadcasting signal 110 is received by the tuner 105 of the TV Box 126. The broadcasting signal 110 is processed by the video decoder 107, and then transmitted to the display 118 via the display signal converter 114. Thus, the objective of turning on the display instantly and watching the television signal is achieved.

As shown in FIG. 1, both objectives mentioned above are achieved, but two tuners, 104 and 105, and two video decoders, 106 and 107, are used. The conventional method mentioned above is thus expensive, wastes space, and is inconvenient.

SUMMARY

It is therefore an objective of the present invention to provide a video signal processing apparatus. With only one tuner and only one video processor, the display can be instantly turned on and the video signal can be watched on the display. Furthermore, the video signal processing apparatus can be connected to a computer, so that the video signal can be recorded in the computer.

It is another objective of the present invention to provide a video signal processing apparatus. The display can be instantly turned on and the video signal can be watched on the display. The video signal can be recorded in a computer storage medium and the video signal recorded in the storage medium can be displayed on the display. Furthermore, a picture-in-picture image can be displayed on the display. When watching the video signal on the display, a user can simultaneously execute other applications in the computer.

In accordance with the foregoing and other objectives of the present invention, a video signal processing apparatus is provided. The video signal processing apparatus includes a tuner, a video processor, a non-interlaced signal processing unit, a microprocessor, and a computer signal converter. The tuner receives a broadcasting signal and generates an original video signal. The video processor receives the original video signal and generates a first digital video signal. The non-interlaced signal processor receives the first digital video signal and generates a display signal. The display signal is watched by a user on the display. The microprocessor is connected to the tuner, the video processor, and the non-interlaced signal processing unit. The microprocessor transmits related data signal to each unit and controls an operation of each unit. The computer signal converter receives the first digital video signal and generates a computer video signal in a general computer interface format. The computer video signal is transmitted to the computer to be read and recorded in a storage media by the computer. When the computer is turned off and the video signal processing apparatus is enabled, the display can be instantly turned on and the video signal can be watched by a user on the display. When the computer is turned on and the video signal processing apparatus is enabled, the display can be instantly turned on and the video signal can be watched by the user on the display. Meanwhile, the video signal can be read and recorded in the storage media by the computer.

In accordance with the foregoing and other objectives of the present invention, a video signal processing apparatus is provided. The video signal processing apparatus includes a first tuner, a second tuner, a first video processor, a second video processor, a computer signal converter, a non-interlaced signal processing unit, and a microprocessor. The first tuner receives a broadcasting signal and generates a first original video signal. The second tuner receives the broadcasting signal and generates a second original video signal. The first video processor receives the first original video signal and generates a first digital video signal. The second video processor receives the second original video signal and generates a second digital video signal. The computer signal converter receives the second digital video signal and generates a computer video signal in a general computer interface format. The computer video signal is transmitted to the computer to be read and recorded in a storage media. The non-interlaced signal processing unit receives the first digital video signal and generates a first display signal. The first display signal is transmitted to a display. The microprocessor is connected to the first tuner, the second tuner, the first video processor, the second video processor, and the non-interlaced signal processing unit. The microprocessor transmits related data signal to each unit and controls an operation of each unit. The computer generates a non-interlaced signal according to the computer video signal and the non-interlaced signal is transmitted to the display, so that the non-interlaced signal is overlapped with the first display signal and a picture-in-picture image is watched by the user on the display. When the computer is turned off and the video signal processing apparatus is enabled, the display can be instantly turned on and the video signal can be watched by the user on the display. When the computer is turned off and the video signal processing apparatus is enabled, the display can be instantly turned on and the video signal can be watched by the user on the display. Meanwhile, the video signal can be read and recorded in the storage media by the computer. The picture-in-picture image is watched by the user on the display.

In accordance with the foregoing and other objectives of the present invention, a computer system is provided. The computer system includes a display, a computer, and a video signal processing apparatus. The video signal processing apparatus mentioned above can be integrated in the computer or the display. It can also be used as an external-enclosure video signal processing apparatus.

It is to be understood that the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
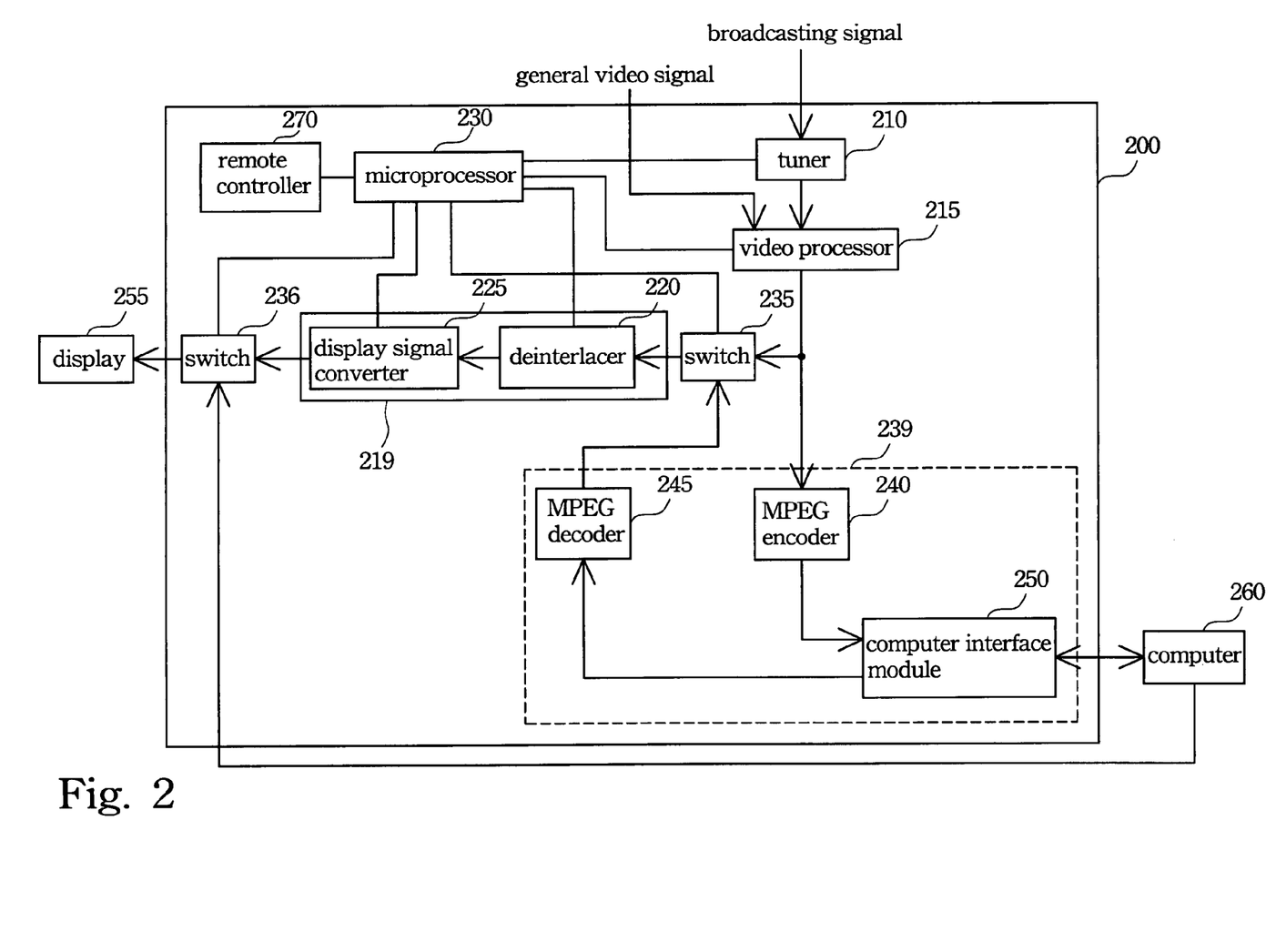
FIG. 2 is a block diagram illustrating the first preferred embodiment of the video signal processing apparatus of the invention.

The operation of the video signal processing apparatus 200 of the invention is given in the following description. The objective that the display can be instantly turned on and the display signal watched by a user on the display is achieved. The video signal processing apparatus 200 can also be connected to a computer, so that the video signal can be read and recorded in a storage media. The video signal mentioned above can be, for example, a broadcasting signal or a general video signal. The broadcasting signal includes an analog or digital signal. For example, the broadcasting signal can be a NTSC or PAL radio frequency (RF) broadcasting signal (or called a television signal), or other digital broadcasting signals. The general video signal includes, but is not limited to, a general video signal provided by a DVD or VCD player, or an analog or digital video signal provided by other video sources. For example, an analog RGB signal, a digital RGB signal, an analog LVDS signal, a digital LVDS signal, a S video signal, or a C video signal can be used as the general video source.

FIG. 2 is a block diagram illustrating the first preferred embodiment of the video signal processing apparatus of the invention. The video signal processing apparatus 200 of the invention includes a tuner 210, a video processor 215, a non-interlaced signal processing unit 219, a microprocessor 230, and a computer signal converter 239. The non-interlaced signal processing unit 219 includes a deinterlacer 220 and a display signal converter 225. The computer signal converter 239 includes a computer interface module 250. The computer interface module 250 includes a computer transmission interface. The computer transmission interface can include, but is not limited to, Universal Serial Bus (USB) and/or 1394 and/or PCI interface. The computer signal converter 239 can further include a MPEG encoder 240 and a MPEG decoder 245. The video signal processing apparatus 200 can further include a switch 235 and/or a switch 236. The microprocessor 230 is connected to the tuner 210, the video processor 215, the deinterlacer 220, the display signal converter 225, the switch 235, and the switch 236. The microprocessor 230 is used to transmit related data signals to each unit and control operation of each unit. It should be noted that when the computer 260 is turned off, the microprocessor 230 is the system control center. The switch 235 and the switch 236 are respectively used to switch between different video signal sources. The switch 235 is used to switch between the video processor 215 and the computer signal converter 239. The switch 236 is used to switch between non-interlaced signal processing unit 219 and the computer 260.

When the video signal processing apparatus 200 is enabled, the tuner 210 receives a broadcasting signal to generate an original video signal and transmits the original video signal to the video processor 215. The method for enabling the video signal processing apparatus 200, for example, can be placing a remote controller 270 such as an infrared (IR) remote controller. A user uses a remote control transmitter (not shown) to activate the remote controller 270 to enable the video signal processing apparatus 200. Alternative methods for enabling the video signal processing apparatus 200 are also applicable. The tuner 210 is used to select a channel among the broadcasting signals, so that a television program is displayed. The video processor 215 includes a video decoder.

If the general video source is provided by a disc player or provided by a non-broadcasting signal such as an analog or digital video signal, the general video signal is not processed by the tuner 210. The video source is directly transmitted to the video processor 215 to be processed.

Next, the video processor 215 generates a first digital video signal according to the received original video signal or the received general video signal, and the first digital video signal is then transmitted to the deinterlacer 220 via the switch 235. For example, the original video signal can be a television analog signal. The video processor 215 processes the television analog signal to generate a television digital signal suitable for digital signal processing.

The deinterlacer 220 then generates a non-interlaced signal according to the first digital video signal and transmits the non-interlaced signal to the display signal converter 225.

Next, the display signal converter 225 generates a non-interlaced signal compatible with the format that can be received by the display 255, and transmits the non-interlaced signal to the display 255 via the switch 236, so that the video can be watched by the user on the display. The display can be a Cathode Ray Tube (CRT) or a Liquid Crystal Display (LCD).

Additionally, the video processor 215 can transmit the first digital video signal to the computer signal converter 239, whereupon the computer signal converter 239 generates a computer video signal in a general computer interface format according to the first digital video signal. The computer video signal is then transmitted to the computer 260. The general computer interface format includes, but is not limited to, USB, 1394, or PCI interface. For example, the MPEG encoder 240 receives the first digital video signal and generates a first MPEG signal compatible with the MPEG standard according to the first digital video signal. The computer interface module 250 receives the first MPEG signal and, according to the first MPEG signal, generates a computer video signal to be read and recorded in the storage media (not shown) by the computer 260. The storage media includes, but is not limited to, a hard disk or an optical storage media such as a CD-R, a CD-RW, a DVD-R, a DVD+RW, or a DVD-RW.

The computer 260 can transmit the recorded computer video signal to the computer interface module 250 and then the computer interface module 250 generates a second MPEG signal. Next, the MPEG decoder 245 receives the second MPEG signal and generates a second digital video signal according to the second MPEG signal. Then, as in the first digital video signal processing procedure mentioned above, the second digital video signal is transmitted to the display 255 via the switch 235, the deinterlacer 220, the display signal converter 225, and the switch 236 in order, to be watched by the user on the display 255.

The video signal processing apparatus 200 operating in various modes is described in the following example. The input video signal is, for example, a broadcasting signal.

When the display 255 is turned on and the computer 260 is turned off, the broadcasting signal is transmitted to the display 255 via the tuner 210, the video processor 215, the switch 235, the deinterlacer 220, the display signal converter 225, and the switch 236 in order. Accordingly, without turning on the computer 260, the broadcasting signal can be watched by the user on the display 255.

When the display 255 is turned on and the computer 260 is turned on, and if the user is going to watch the broadcasting signal, there are two transmission paths for the user to choose from. According to the first path, the broadcasting signal is transmitted to the display 255 via the tuner 210, the video processor 215, the switch 235, the deinterlacer 220, the display signal converter 225, and the switch 236 in order. When operated using the first path, the broadcasting signal can be transmitted to the computer 260 via the computer signal converter 239 to be recorded by the computer 260.

According to the second path, the broadcasting signal is transmitted to the display 255 via the tuner 210, the video processor 215, the MPEG encoder 240, the computer interface module 250, the computer 260, and the switch 236 in order. When operating using the second path, the user can execute applications in the computer 260 simultaneously. For example, the user can use Word or Excel software to perform editing. During operation using the second path, the broadcasting signal can also be recorded in the storage media in the computer 260. In other words, the broadcasting signal can be recorded whenever transmitted through the computer 260. To avoid redundant description, the same procedure is omitted for simplicity.

If the user wants to read the video signal recorded in the storage media, the user can choose between two transmission paths. According to the first path, the video signal is transmitted to the display 255 via the computer interface module 250, the MPEG decoder 245, the switch 235, the deinterlacer 220, the display signal converter 225, and the switch 236 in order. For the second path, after being processed by the computer 260, the video signal is transmitted to the display 255 via the switch 236. When operating using the second path, the user can execute other applications in the computer simultaneously. For example, the user can use Word or Excel to perform editing.

In the first embodiment, if the display 255 itself has the function of signal converting like the non-interlaced signal processing unit 219, the non-interlaced signal processing unit 219 can be excluded from the video signal processing apparatus 200 of the invention. Additionally, the switch 235 and the switch 236 can be selected according to the designer's need.

Figure 3:
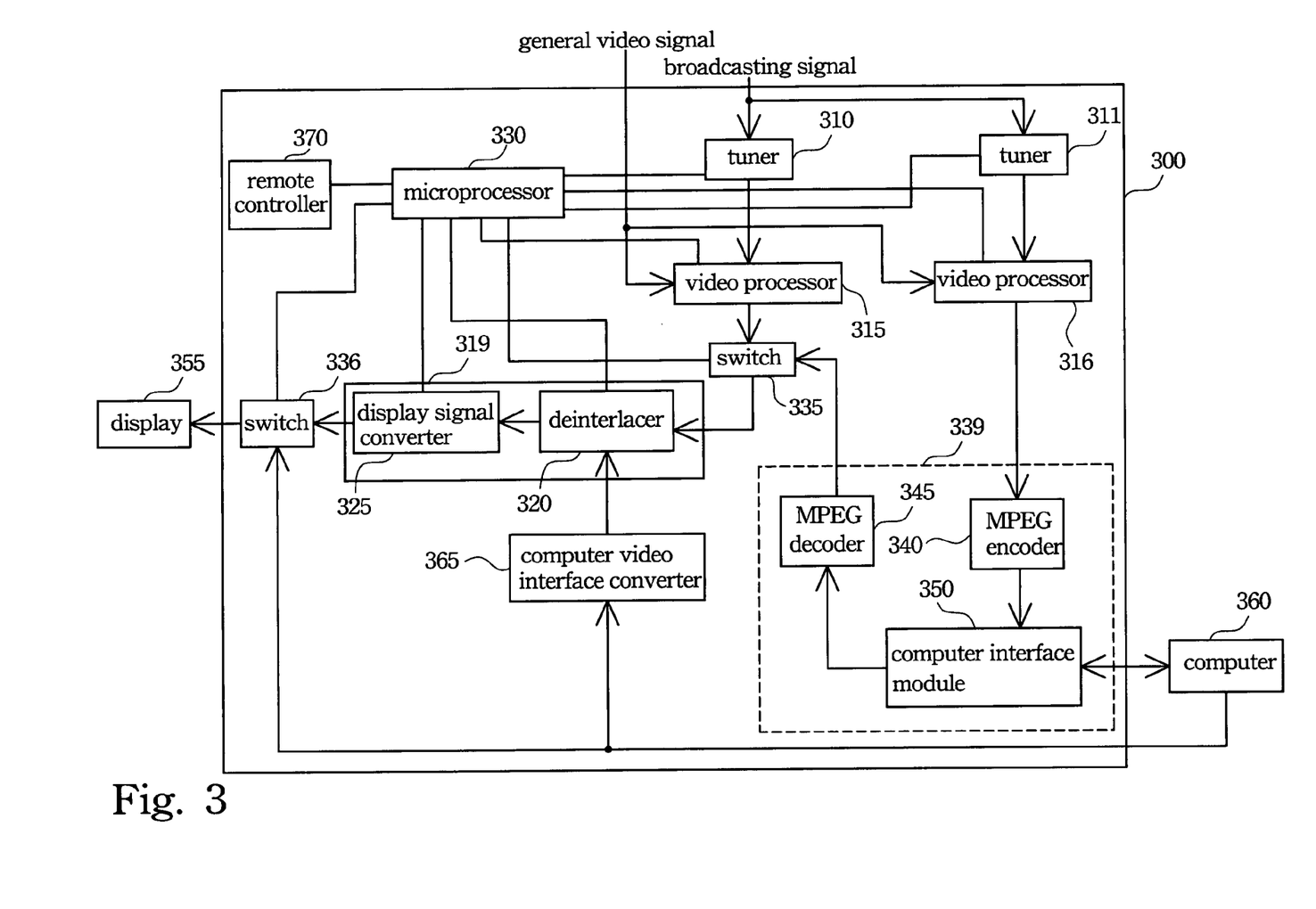
FIG. 3 is a block diagram illustrating the second preferred embodiment of the video signal processing apparatus of the invention.

FIG. 3 is a block diagram of the second preferred embodiment of the video signal processing apparatus of the invention. The structure of the video signal processing apparatus 300 of the second preferred embodiment is similar to the structure of the video signal processing apparatus 200 of the first preferred embodiment. The most important difference is that a tuner 311 and a video processor 316 are added to the video signal processing apparatus 300. The objective is to add a feature of picture-in-picture image.

The video signal processing apparatus 300 of the invention includes a tuner 310, a tuner 311, a video processor 315, a video processor 316, a non-interlaced signal processing unit 319, a microprocessor 330, and a computer signal converter 339. The non-interlaced signal processing unit 319 includes a deinterlacer 320 and a display signal converter 325. The computer signal converter 339 includes a computer interface module 350, and the computer interface module 350 includes a computer transmission interface. The computer transmission interface includes, but is not limited to, USB and/or 1394 and/or PCI interface. The computer signal converter 339 can further include a MPEG encoder 340 and a MPEG decoder 345. The video signal processing apparatus 300 can further include the switch 335 and/or the switch 336. The video signal processing apparatus 300 can also include a computer video interface converter 365. The microprocessor 330 is connected to the tuner 310, the tuner 311, the video processor 315, the video processor 316, the deinterlacer 320, the display signal converter 325, the switch 335, and the switch 336. The microprocessor 330 is used to transmit related data signal to each unit and control an operation of each unit. It should be noted that when the computer 360 is turned off, the microprocessor 330 is a master. In other words, the microprocessor 330 is the system control center. The switch 335 and the switch 336 are respectively used to switch between different video sources. The switch 335 is used to switch between the video processor 315 and the computer signal converter 339. The switch 336 is used to switch between the non-interlaced signal processing unit 319 and the computer 360.

In the second embodiment of the invention, the source of the video is, for example, a broadcasting signal. If the general video source is provided by a disc player or provided by a non-broadcasting signal such as an analog or digital video signal, the video source is not processed by the tuner 310 or processed by the tuner 311. The video source is directly transmitted to the video processor 315 and the video processor 316 to be processed. Besides, the video source can come from the broadcasting signal and come from the video signal simultaneously, so that a picture-in-picture image having both the broadcasting signal and the video signal is provided.

When both the display 355 and the computer 360 are turned on and the video signal processing apparatus 300 is enabled, the tuner 310 and the tuner 311 receive the broadcasting signal and generate a first original video signal and a second original video signal, respectively. The first original video signal and the second original video signal represent different channels of the same broadcasting signal. The first original video signal and the second original video signal are then transmitted to the video processor 315 and the video processor 316 respectively, as shown in FIG. 3. The video processor 315 and the video processor 316 can respectively include a video decoder. The method for enabling the video signal processing apparatus 300, for example, can be placing a remote controller 370, such as an infrared (IR) remote controller, in the video signal processing apparatus 300, as shown in FIG. 2. A user can use a remote control transmitter (not shown) to activate the remote controller 370 to enable the video signal processing apparatus 300. Alternative methods for enabling the video signal processing apparatus 300 are also applicable.

Next, the video processor 315 generates a first digital video signal according to the first original video signal or the video signal which has been received by the video processor 315. The first digital video signal is transmitted to the deinterlacer 320 via the switch 335.

Additionally, the video processor 316 generates a second digital video signal according to the second original video signal or the video signal received by the video processor 316. The second digital video signal is transmitted to the computer signal converter 339. The computer signal converter 339 generates a computer video signal in a general computer interface format. The general computer interface format includes, but is not limited to, USB, 1394, or PCI interface. For example, the MPEG encoder 340 receives the second digital video signal and generates a first MPEG signal compatible with the MPEG standard according to the second digital video signal. The computer interface module 350 receives the first MPEG signal and, according to the first MPEG signal, generates a computer video signal to be read and recorded in the storage media (not shown) by the computer 360. The storage media includes, but is not limited to, a hard disk or an optical storage media such as a CD-R, a CD-RW, a DVD-R, a DVD+RW, or a DVD-RW.

Next, the computer 360 generates a computer video interface signal such an analog LVDS signal or a DVI signal. The computer video interface signal is then transmitted to the computer video interface converter 365.

After that, the computer video interface converter 365 generates a third digital video signal according to the computer video interface signal. The third digital video signal is then transmitted to the deinterlacer 320. The third digital video signal is, for example, a digital RGB signal.

Next, the deinterlacer 320 performs image overlapping according to the first digital video signal and the third digital video signal, so that a no-interlaced and overlapped picture-in-picture image is provided.

After that, the display signal converter 325 generates a display signal compatible with the format that can be received by the display 355. The display signal is transmitted to the display 355 via the switch 336, so that a picture-in-picture image can be watched by the user on the display 355.

It should be noted that the computer 360 can generate a non-interlaced display signal, such as an analog RGB signal, according to the computer video signal. The computer 360 transmits the non-interlaced display signal to the switch 336 to perform image overlapping with the display signal from the non-interlaced signal processing unit 319, so that the picture-in-picture image can be watched by the user on the display 355. Therefore, there are two paths for image overlapping and the user can choose from the two paths.

Other operation modes for the second embodiment are described now. For example, as described in the first embodiment, the user can read the video signal recorded in the storage media of the computer 360 and execute other applications in the same computer 360 simultaneously. To avoid redundant description, the same procedure is omitted here.

Additionally, in the second embodiment, if the display 355 itself has the function of signal conversion like the non-interlaced signal processing unit 319, the non-interlaced signal processing unit 319 can be excluded from the video signal processing apparatus 300 of the invention. The switch 335 and the switch 336 can also be selected according to the designer's need.

Figure 4A:
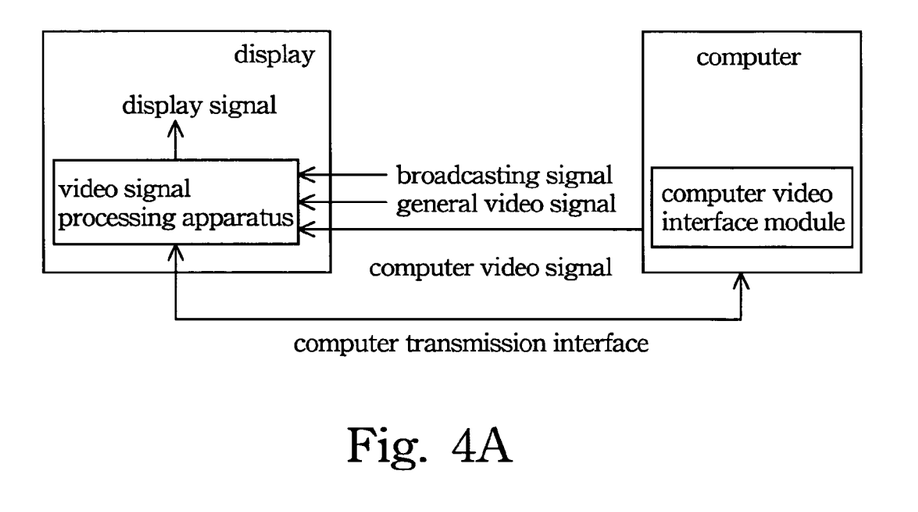
FIG. 4A–FIG. 4C are block diagrams illustrating the applications of the computer system integrated with the video signal processing apparatus of the invention.
Figure 4B:
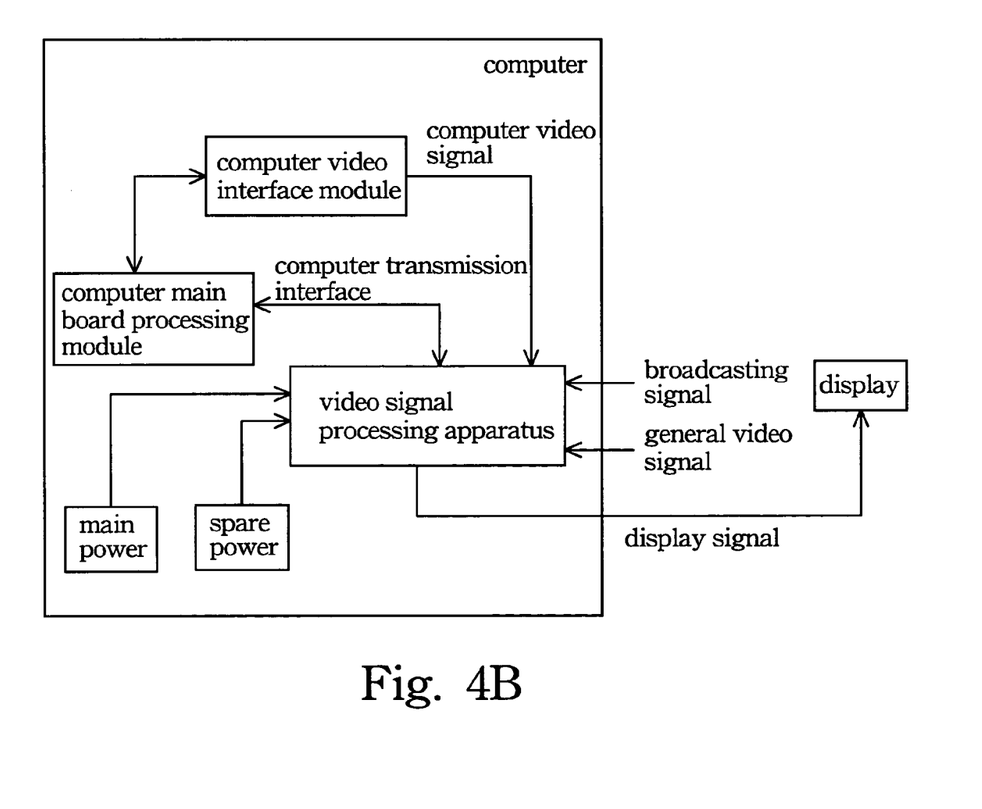
Figure 4C:
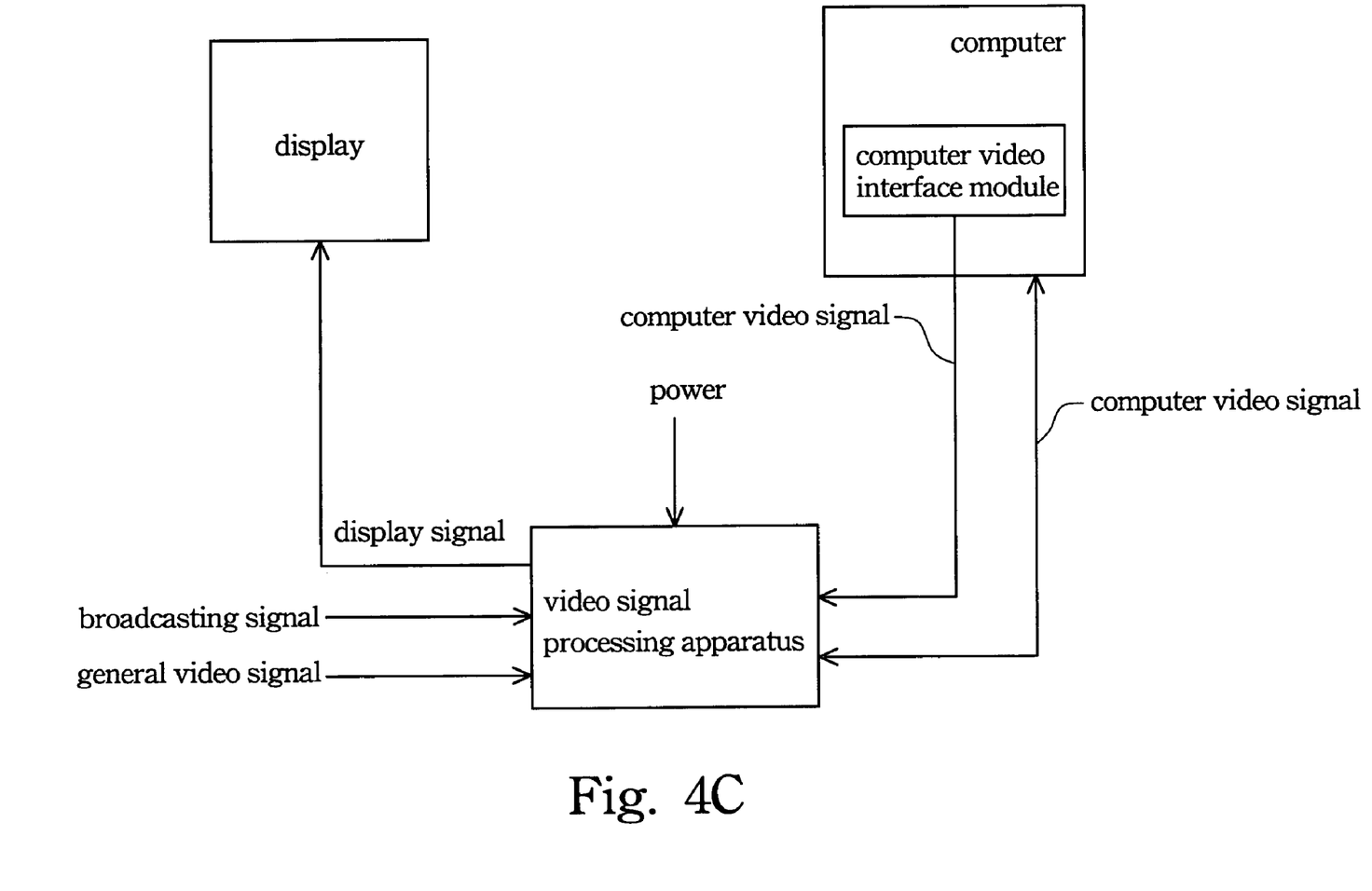

FIG. 4A–FIG. 4C are block diagrams illustrating the application integrated with the video signal processing apparatus of the invention. FIG. 4A is a block diagram illustrating an application of a computer system in which the video signal processing apparatus is integrated with a display. FIG. 4B is a block diagram illustrating an application of a computer system in which the video signal processing apparatus is integrated with a computer. FIG. 4C is a block diagram illustrating an application of a computer system in which the video signal processing apparatus is designed for external-enclosure. The power source of the video signal processing apparatus in FIG. 4A is provided by the display. The power source of the video signal processing apparatus in FIG. 4B is provided by the spare power or by the main power of the computer. The power source of the video signal processing apparatus in FIG. 4C is provided by an external power.

The video signal processing apparatus in FIG. 4A–FIG. 4C can be the first embodiment or the second embodiment (200 or 300) of the invention. The operation modes are described in the above and the same procedure is omitted for simplicity.

According to the first preferred embodiment of the invention, as shown in FIG. 2, it is possible to use only one tuner 210 and only one video processor 215 in the video signal processing apparatus 200. With the advantages mentioned above, the display can still be turned on instantly and the video signal can be watched by the user on the display. Hence, the cost and the space can be reduced. Additionally, while watching the video signal, the user can execute applications in the computer simultaneously to perform other operation such as editing.

According to the second preferred embodiment of the invention, as shown in FIG. 3, it is possible to turn the display on instantly and watch the video signal on the display. Meanwhile, the video signal can be recorded in the storage media of the computer and the picture-in-picture image can be provided on the display.

According to the first and the second preferred embodiments of the invention, as shown in FIG. 3 and FIG. 4, in both the video signal processing apparatus 200 and 300, the video signal recorded in the storage media of the computer can be displayed on the display.

In summary, in the video signal processing apparatus of the invention, the display can be instantly turned on and the video signal is watched by the user on the display. The video signal can be recorded in the storage media of a computer. The video signal recorded in the storage media can be displayed on the display and a picture-in-picture image can also be provided on the display. While watching the video signal on the display, the user can execute applications in the computer simultaneously.

Although the present invention has been described in considerable detail with reference to certain preferred embodiments thereof, other embodiments are possible. Therefore, their spirit and scope of the appended claims should no be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A video signal processing apparatus, comprising:
   a tuner for receiving a broadcasting signal and generating an original video signal;
   a video processor for receiving said original video signal and generating a first digital video signal;
   a non-interlaced signal processing unit for receiving said first digital video signal and generating a display signal for a user to be watched on a display;
   a microprocessor connected to said tuner, said video processor and said non-interlaced signal processing unit, for transmitting related data signal to each unit and controlling an operation of each unit; and
   a computer signal converter for receiving said first digital video signal, generating a computer video signal in a general computer interface format, and transmitting said computer video signal to a computer to be read and recorded in a storage media, wherein said computer signal converter comprises:
      a MPEG encoder for receiving said first digital video signal and generating a first MPEG signal compatible with a MPEG standard;
      a computer interface module for receiving said first MPEG signal and generating said computer video signal to be read and recorded in said storage media by said computer; and
      a MPEG decoder, wherein said computer transmits said computer video signal recorded in said storage media to said computer interface module, so that said computer interface module generates a second MPEG signal, and said MPEG decoder receives said second MPEG signal to generate a second digital video signal, and said second digital video signal is transmitted to said display via said non-interlaced signal processing unit;
   wherein when said computer is turned off and said video signal processing apparatus is enabled, said display is instantly turned on and said display signal is watched by said user on said display; and wherein when said computer is turned on and said video processing apparatus is enabled, said display is instantly turned on and said display signal is watched by said user on said display, and said computer video signal is read and recorded in said storage media by said computer.

2. The video signal processing apparatus of claim 1, wherein said video signal processing apparatus further comprises a switch connected to said microprocessor and placed between said video processor and said non-interlaced signal processing unit, and said switch performs switching between said video processor and said computer signal converter.

3. The video signal processing apparatus of claim 1, wherein said video signal processing apparatus further comprises a switch connected to said microprocessor and placed between said non-interlaced signal processing unit and said display, and said switch performs switching between said non-interlaced signal processing unit and said computer.

4. The video signal processing apparatus of claim 1, wherein said non-interlaced signal processing unit comprises:
   a deinterlacer for receiving said first digital video signal and generating a non-interlaced signal; and
   a display signal converter for receiving said non-interlaced signal and generating said display signal to be watched by said user on said display.

5. The video signal processing apparatus of claim 1, wherein said computer signal converter comprises a computer transmission interface.

6. The video signal processing apparatus of claim 1, wherein said video signal processing apparatus further comprises a remote controller connected to said microprocessor and said user uses a remote control transmitter to activate said remote controller to enable said video signal processing apparatus.

7. The video signal processing apparatus of claim 1, wherein said video processor further comprises receiving a general video signal and said video processor generates said first digital video signal according to said original video signal or said general video signal.

8. The video signal processing apparatus of claim 1, wherein said video processor comprises a video decoder.

9. A video signal processing apparatus, comprising:
   a first tuner for receiving a broadcasting signal and generating a first original video signal;
   a second tuner for receiving said broadcasting signal and generating a second original video signal;
   a first video processor for receiving said first original video signal and generating a first digital video signal;
   a second video processor for receiving said second original video signal and generating a second digital video signal;
   a computer signal converter for receiving said second digital video signal, generating a computer video signal in a general computer interface format, and transmitting said computer video signal to a computer to be read and recorded in a storage media by said computer, wherein said computer signal converter comprises:
      a MPEG encoder for receiving said first digital video signal and generating a first MPEG signal compatible with a MPEG standard;
      a computer interface module for receiving said first MPEG signal and generating said computer video signal to be read and recorded in said storage media by said computer; and
      a MPEG decoder, wherein said computer transmits said computer video signal recorded in said storage media to said computer interface module, so that said computer interface module generates a second MPEG signal, and said MPEG decoder receives said second MPEG signal to generate a second digital video signal, and said second digital video signal is transmitted to said display via said non-interlaced signal processing unit;

a non-interlaced signal processing unit for receiving said first digital video signal, generating a first display signal, and transmitting said first display signal to a display; and a microprocessor connected to said first tuner, said second tuner, said first video processor, said second video processor, and said non-interlaced signal processing unit, for transmitting related data signal to each unit and controlling an operation of each unit;

wherein said computer generates a non-interlaced display signal according to said computer video signal and transmits said non-interlaced display signal to said display to perform image overlapping with said first display signal, so that a picture-in-picture image is watched by said user on said display;

wherein when said computer is turned off and said video signal processing apparatus is enabled, said display is instantly turned on and said display signal is watched by said user on said display; and wherein when said computer is turned on and said video processing apparatus is enabled, said display is instantly turned on and said display signal is watched by said user on said display, and said computer video signal is read and recorded in said storage media by said computer, so that a picture-in-picture image is watched by said user on said display.

10. The video signal processing apparatus of claim 9, wherein said video processing apparatus further comprises a switch connected to said microprocessor and placed between said first video processor and said non-interlaced signal processing unit, for performing switching between said first video processor and said computer signal converter.

11. The video signal processing apparatus of claim 9, wherein said video processing apparatus further comprises a switch connected to said microprocessor and placed between said non-interlaced signal processing unit and said display, for performing switching between said non-interlaced signal processing unit and said computer.

12. The video signal processing apparatus of claim 11, wherein said switch receives said first display signal from said non-interlaced signal processing unit and said non-interlaced display signal from said computer, and said switch performs image overlapping, so that a picture-in-picture image is watched by said user on said display.

13. The video signal processing apparatus of claim 9, wherein said non-interlaced signal processing unit comprises:
   a deinterlacer for receiving said first digital video signal and generating a non-interlaced signal; and
   a display signal converter for receiving said non-interlaced signal and generating said first display signal.

14. The video signal processing apparatus of claim 9, wherein said video signal processing apparatus further comprises:
   a computer wherein said computer generates a computer video interface signal according to said computer video signal and wherein said computer video interface converter is used to receive said computer video interface signal, so that said computer video interface converter generates a third digital video signal;

wherein said non-interlaced signal processing unit receives said first digital video signal and said third digital video signal, and performs image overlapping, so that said non-interlaced signal processing unit generates a picture-in-picture image watched by said user on said display.

15. The video signal processing apparatus of claim 9, wherein said computer signal converter comprises a computer transmission interface.

16. The video signal processing apparatus of claim 9, wherein said video signal processing apparatus further comprises a remote controller connected to said microprocessor and said user uses a remote control transmitter to activate said remote controller to enable said video signal processing apparatus.

17. The video signal processing apparatus of claim 9, wherein said first video processor further comprises receiving a general video signal and said first video processor generates said first digital video signal according to said first original video signal or said general video signal.

18. The video signal processing apparatus of claim 9, wherein said second video processor further comprises receiving a general video signal and said second video processor generates said second digital video signal according to said second original video signal or said general video signal.

19. The video signal processing apparatus of claim 9, wherein said first and second video processor comprise a video decoder respectively.

20. A computer system, comprising:
a computer; and
a video signal processing apparatus, comprising:
   a tuner for receiving a broadcasting signal and generating an original video signal;
   a video processor for receiving said original video signal and generating a first digital video signal;
   a microprocessor connected to said tuner and said video processor, for transmitting related data signal to each unit and controlling an operation of each unit;
a computer signal converter for receiving said first digital video signal, generating a computer video signal in a general computer interface format, and transmitting said computer video signal to said computer to be read and recorded in a storage media by said computer, wherein said computer signal converter comprises:
   a MPEG encoder for receiving said first digital video signal and generating a first MPEG signal compatible with a MPEG standard;
   a computer interface module for receiving said first MPEG signal and generating said computer video signal to be read and recorded in said storage media by said computer; and
   a MPEG decoder, wherein said computer transmits said computer video signal recorded in said storage media to said computer interface module, so that said computer interface module generates a second MPEG signal, and said MPEG decoder receives said second MPEG signal to generate a second digital video signal, and said second digital video signal is transmitted to said display via said non-interlaced signal processor unit; and
a display comprising a non-interlaced signal processing unit, wherein said non-interlaced signal processing unit receives said first digital video signal and generates a display signal so that said display signal is watched by a user on said display;

wherein when said computer is turned off and said video signal processing apparatus is enabled, said display is instantly turned on and said display signal is watched by said user on said display; and wherein when said computer is turned on and said video processing apparatus is enabled, said display is instantly turned on and said display signal is watched by said user on said display, and said computer video signal is read and recorded in said storage media by said computer.

21. A computer system, comprising:

a computer; and a video signal processing apparatus, comprising:
- a first tuner for receiving a broadcasting signal and generating a first original video signal;
- a second tuner for receiving said broadcasting signal and generating a second original video signal;
- a first video processor for receiving said first original video signal and generating a first digital video signal;
- a second video processor for receiving said second original video signal and generating a second digital video signal;
- a computer signal converter for receiving said second digital video signal, generating a computer video signal in a general computer interface format, and transmitting said computer video signal to said computer to be read and recorded in a storage media by said computer, wherein said computer signal converter comprises:
  - a MPEG encoder for receiving said first digital video signal and generating a first MPEG signal compatible with a MPEG standard;
  - a computer interface module for receiving said first MPEG signal and generating said computer video signal to be read and recorded in said storage media by said computer; and
- a MPEG decoder, wherein said computer transmits said computer video signal recorded in said storage media to said computer interface module, so that aid computer interface module generates a second MPEG signal, and said MPEG decoder receives said second MPEG signal to generate a second digital video signal, and said second digital video signal is transmitted to said display via said non-interlaced signal processing unit;
- a microprocessor connected to said first tuner, said second tuner, said first video processor, and said second video processor, for transmitting related data signal to each unit and controlling an operation of each unit; and
- a display comprising a non-interlaced signal processing unit, wherein said non-interlaced signal processing unit receives said first digital video signal and generates a first display signal;

wherein said computer generates a second display signal according to said computer video signal and transmits said second display signal to said display to perform image overlapping with said first display signal, so that a picture-in-picture image is watched by said user on said display;

wherein when said computer is turned off and said video signal processing apparatus is enabled, said display is instantly turned on and said first display signal is watched by said user on said display; and wherein when said computer is turned on and said video processing apparatus is enabled, said display is instantly turned on and said display signal is watched by said user on said display, and said computer video signal is read and recorded in said storage media by said computer, so that a picture-in-picture image is watched by said user on said display.

22. A computer system comprising a display and a computer, wherein said display comprises said video signal processing apparatus of claim 1 or claim 9.

23. A computer system comprising a display and a computer, wherein said computer comprises said video signal processing apparatus of claim 1 or claim 9.

24. A computer system comprising a display, a computer, and a video signal processing apparatus, wherein said video signal processing apparatus comprises said video signal processing apparatus of claim 1 or claim 9.

* * * * *